United States Patent [19]

Yang

[11] Patent Number: 4,997,305

[45] Date of Patent: Mar. 5, 1991

[54] LOCKING MECHANISM

[76] Inventor: David Y. Yang, 2nd Flr., No. 2, Lane 497, Chung-Chen Rd, Shin-Deng, Taipei, Taiwan

[21] Appl. No.: 444,935

[22] Filed: Dec. 4, 1989

[51] Int. Cl.[5] .................... F16B 1/04

[52] U.S. Cl. .................... 403/322; 439/362; 269/222; 74/89.15

[58] Field of Search .................... 269/222, 223; 439/362, 439/364, 365; 74/89.15; 403/322, 321, 325, 24

[56] References Cited

U.S. PATENT DOCUMENTS 341,767 5/1886 Otto .................... 269/222 X
661,597 11/1900 Behrens .................... 269/222 X
721,639 2/1903 Wermes .................... 269/222
4,398,780 8/1983 Novotny et al. .................... 439/362 X
4,785,684 11/1988 Nishikawa et al. .................... 74/89.15 X

*Primary Examiner*—Peter M. Cuomo
*Attorney, Agent, or Firm*—Cushman, Darby & Cushman

[57] ABSTRACT

A locking mechanism capable of holding together two small housings having minimal room for manual operation is provided. The locking mechanism includes a housing rotatably mounting therein an intermediate gear and two shafted gears, each having an axial hole which receives an engaging element having a threaded portion engageable with threaded hole in another housing in the manner that when any one of the gears is rotated the other two gears will be rotated accordingly.

6 Claims, 2 Drawing Sheets

LOCKING MECHANISM

BACKGROUND OF THE INVENTION

The present invention relates to a locking mechanism, and more particularly to one for a peripheral equipment for the computer.

In order to transmit and/or receive data and/or information, a computer is always provided with a plurality of connectors for connecting thereto kinds of peripheral equipment. For example, a modem is connected to a computer by means of a first connector to be inserted on a corresponding connector. In order to suitably connect together the connectors, two screws on sides of the first connector are provided and cannot easily be screwed on the computer since there is not enough room for manual operation which is troublesome espeically for portable modems being frequently assembled to and detached from the computer.

It is therefore attemped by the present invention to deal with the situation above described.

SUMMARY OF THE INVENTION

It is therefore an object of the present invention to provide a locking mechanism capable of conveniently and easily connecting a peripheral equipment to a computer.

It is further an object of the present invention to provide a locking mechanism capable of preforming the connecting operation without using a tool.

According to the present invention, a locking mechanism includes a first housing having an engaging end having two holes, two spaced shafted gears rotatably mounted in the housing and each of which coaxially fixes thereto an engaging medium having a threaded portion capable of passing through one of the holes of a second housing in engaging medium having a threaded holes of a second housing in order to thus hold together the two housings, and an intermediate gear meshed between the two shafted gears so that when any one of the gears is rotated, the other two gears will in turn be rotated.

The present invention may best be understood through the following description with reference to the accompanying drawings, in which:

DETAILED DESCRIPTION OF THE PREFERRED EMBODIMENT

Figure 2:
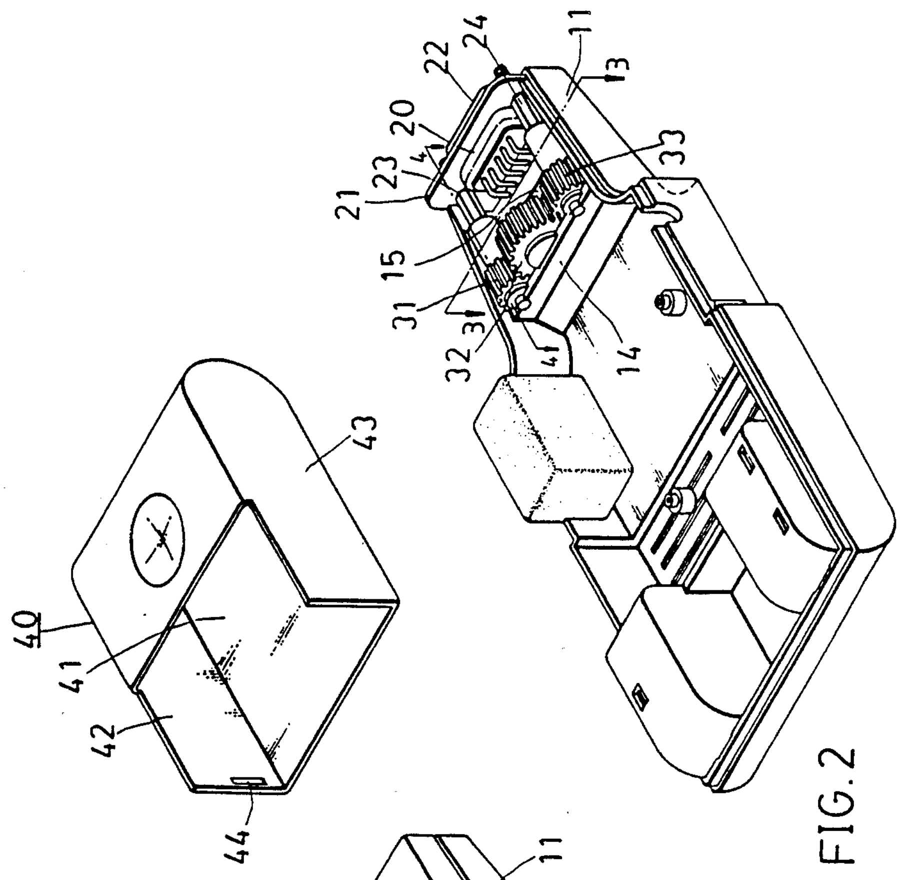
FIG. 2 is a perspective view showing an inner structure of a locking mechanism in FIG. 1.
Figure 1:
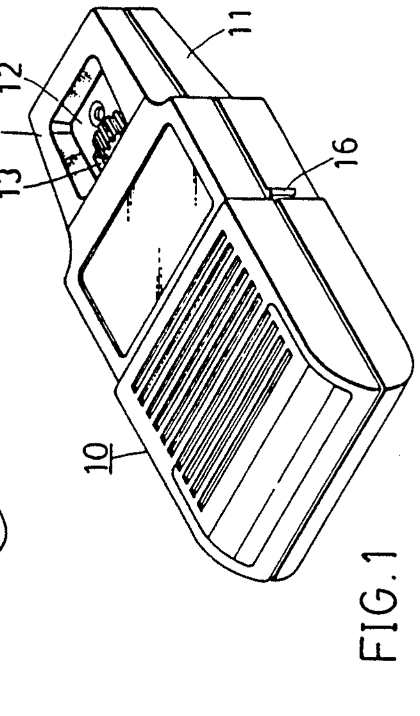
FIG. 1 is a perspective view showing a preferred embodiment of a locking mechanism according to the present invention.

Referring now to FIGS. 1-5, a locking mechanism according to the present invention inlcudes a first housing 10 having a first engaging end 21 having two first spaced holes 23,24 respectively aligning with two threaded holes 52,53 of a second engaging end 51 of a second housing 50, and a front cover 40 which is to receive therein the front part 11 of housing 10 and includes a partly open top 41 and two sides 42, 43 each of which has a small inner groove 4 engageable with two side engaging ribs 16 of housing 10.

Housing 10 can be made of plastic and front part 11 can include a recess 12 and a through hole 13. Engaging end 21 mounts thereon a connector 20 having a 9 pins-plug 22 to be connected to another connector 60 mounted on engaging end 51.

Front Part 11 includes two ribs 14,15 rotatably mounting therebetween two spaced gears 31,33 and an intermeidate gear 32 meshed between gears 31,33 respectively having two polygonal shaped axial holes 312,332 respectively receiving therein two springs 34,35 respectively urging against two engaging elements 36,37 which respcetively include two polygonal shaped portions respectively received in axial to holes 312,332 and two threaded portions 361,371 respectively passing through spaced holes 23,24 to respectively threadedly engage with threaded holes 52,53. Intermediate gear 32 being larger is an idler protrudes beyond through hole 13 and can be rotated by the fingers of an operator to enable gears 31,33 to be in turn rotated in the same direction which in turn results in that threaded portions 361,371 can respectively be screwed into threaded holes 52,53 to thus connect together connectors 20,60 and housings 10,50. If intermediate gear 32 is rotated in a reverse direction, threaded portions 361,371 will be disengaged from threaded holes 52,53 to enable connector 20 to be detached from connector 60.

Figure 6:
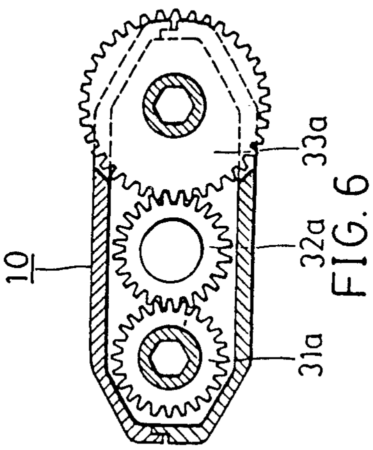
FIG. 6 is a schematical view showing a second preferred embodiment of a gear assembly for a locking mechanism in FIG. 1.
Figure 3:
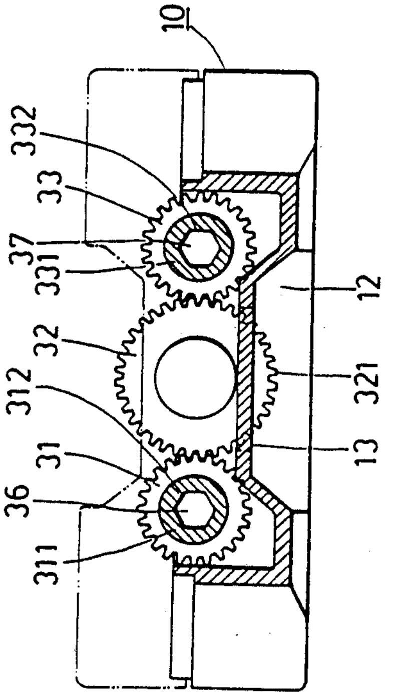
FIG. 3 is a sectional view taken along 3—3 in FIG. 2.
Figure 4:
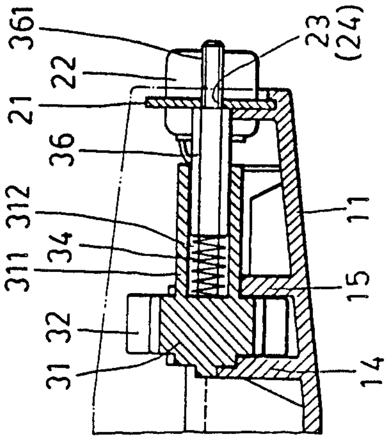
FIG. 4 is a sectional view taken along line 4—4 in FIG. 2.

As shown in FIG. 6, a gear assembly for the present invention can alternatively include an intermediate gear 32*a* being an idler and two shafted gears 31*a*,33*a* in which gear 33*a* is a larger and active gear and protrudes beyond housing 10 to perform the same funtion above described.

Figure 7:
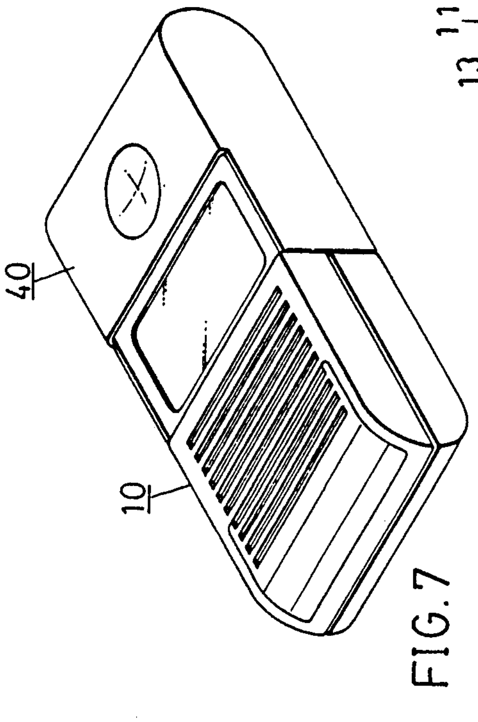
FIG. 7 is an assembled view of a locking mechanism in FIG. 1.
Figure 5:
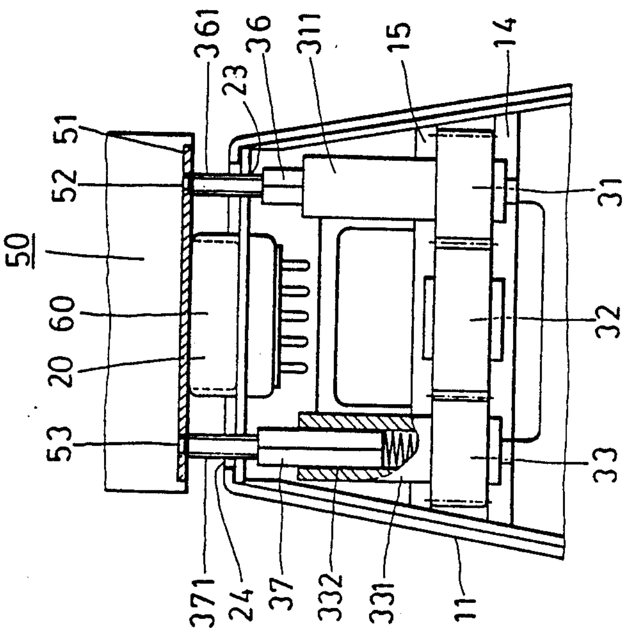
FIG. 5 is a schematical view showing a locking mechanism in FIG. 1 in use.

As shown in FIG. 7, if housing 10 is not in use, cover 40 is covered on front part 11 to engage together grooves 44 and ribs 16 to protect therein and/or improve the appearance of the front part 11.

Through the above description, it should now be understood how and why the present invention can achieve the object it contemplates.

What I claim is:

1. A locking mechanism comprising:

a first housing having a first engaging end having two spaced holes;

a second housing having a second engaging end having two threaded holes respectively aligning with said spaced hole;

two spaced shafted gears rotatably mounted in said first housing and each of which has an axial hole which receives therein an engaging portion of an engaging means and a spring urging against said engaging means, said engaging means including a threaded portion capable of passing through one of said spaced holes to threadly engage with one of said threaded holes in order to thus hold together said first and second housings; and an intermediate gear meshed between said shafted gears and rotatably mounted in said first housing so that when any one of said shafted and intermediate gears is rotated, the other two gears will in turn be rotated.

2. The locking mechanism of claim 1 wherein said axial hole is has a polygonal shape and said engaging portion of said engaging means is crosssectionally polygonal and is incapable of passing through said one spaced hole.

3. A locking mechanism comprising:

a first housing having a first engaging end having two spaced holes;

a second housing having a second engaging end having two threaded holes respectively aligning with said two spaced holes;

two spaced shafted gears rotatably mounted in said first housing and each of which has a polygonal shaped axial hole and coaxially fixed thereto an engaging means which includes a threaded portion capable of passing through one of said spaced holes to threadedly engage with one of said threaded holes in order to thus hold together said first and second housing, and a polygonal shaped portion received in said axial hole and incapable of passing through said one spaced hole; and an intermediate gear meshed between said shafted gears and rotatably mounted in said first housing so that when any one of said shafted and intermediate gears is rotated, the other two gears will in turn be rotated.

4. A locking mechanism according to claim 3 wherein said intermediate gear is an active gear and said shafted gears are following gears.

5. A locking mechanism according to claim 3 wherein one of said shafted gears is an active gear, the other shafted gear is a following gear and said intermediate gear is an idler.

6. A locking mechanism comprising:

a first housing having a first engaging end having two spaced holes;

a second housing having a second engaging end having two threaded holes;

two spaced shafted gears rotatably mounted in said first housing and each of which has a polygonal shaped axial hole and coaxially fixed thereto an engaging means which includes a threaded portion capable of passing through one of said spaced holes to threadedly engage with one of said threaded holes in order to thus hold together said first and second housing, and a polygonal shaped postion received in said axial hole and incapable of passing through said one spaced hole;

a spring received in said axial hole which urges against said engaging means; and an intermediate gear meshed between said shafted gears and rotatably mounted in said first housing so that when any one of said shafted and intermediate gears is rotated, the other two gears will in turn be rotated.

* * * * *